US012563059B2

(12) United States Patent　　　(10) Patent No.:　US 12,563,059 B2

Gundersen　　　(45) Date of Patent:　Feb. 24, 2026

(54) NETWORK VULNERABILITY ASSESSMENT

(71) Applicant: SecurityMetrics, Inc., Orem, UT (US)

(72) Inventor: Trent Gundersen, Orem, UT (US)

(73) Assignee: SecurityMetrics, Inc., Orem, UT (US)

(*) Notice: Subject to any disclaimer, the term of this patent is extended or adjusted under 35 U.S.C. 154(b) by 370 days.

(21) Appl. No.: 17/658,598

(22) Filed: Apr. 8, 2022

(65) Prior Publication Data

US 2023/0328083 A1　　Oct. 12, 2023

(51) Int. Cl.
  *H04L 29/06*　　　(2006.01)
  *H04L 9/40*　　　(2022.01)
  *H04L 29/12*　　　(2006.01)

(52) U.S. Cl.
  CPC ...... *H04L 63/1425* (2013.01); *H04L 63/1416* (2013.01); *H04L 63/1433* (2013.01); *H04L 63/1466* (2013.01); *H04L 63/20* (2013.01)

(58) Field of Classification Search
  CPC ............ H04L 63/1416; H04L 63/1425; H04L 63/1433; H04L 63/1466; H04L 63/20
  USPC ..................................................... 726/22–25
  See application file for complete search history.

(56) References Cited

U.S. PATENT DOCUMENTS

| | | | | |
|---|---|---|---|---|
| 6,301,668 | B1 * | 10/2001 | Gleichauf | ........... H04L 63/1416 726/25 |
| 6,324,656 | B1 * | 11/2001 | Gleichauf | ........... H04L 63/1433 726/23 |
| 7,784,099 | B2 * | 8/2010 | Benjamin | ........... H04L 63/1433 726/25 |
| 9,544,323 | B2 * | 1/2017 | Porcello | .............. H04L 63/1433 |
| 10,298,611 | B1 * | 5/2019 | Caldwell | ............. H04L 63/1433 |
| 11,533,328 | B2 * | 12/2022 | Nunes | ................. H04L 63/1433 |
| 11,588,852 | B2 * | 2/2023 | Watters | ............... H04L 63/1433 |
| 11,689,554 | B2 * | 6/2023 | Pagano | ............... H04L 63/1425 726/25 |

(Continued)

FOREIGN PATENT DOCUMENTS

CN　　　114257391 A　　3/2022

OTHER PUBLICATIONS

European Search Report and Written Opinion, as issued in connection with European Patent Application No. 23167179.3, dated Aug. 25, 2023.

*Primary Examiner* — Bharat Barot

(74) *Attorney, Agent, or Firm* — Maschoff Brennan; Paul G. Johnson

(57)　　　　　ABSTRACT

A method may include obtaining first network information from a network scan of a computer network that describes network vulnerabilities of a computer network and second network information that describes network traffic of the computer network. The method may include identifying an interaction with the computer network based on the network traffic included in the second network information. The method may include correlating the first network information and the identified interaction to determine a network security issue for the computer network. Correlating the first network information and the identified interaction may include determining a correspondence between the interaction with the computer network and the network vulnerabilities described by the first network information. A network alert may be generated based on the potential network security issue.

20 Claims, 5 Drawing Sheets

400

410　Obtain first network information that describes network vulnerabilities of a computer network 420　Obtain second network information that describes network traffic of the computer network 430　Identify interactions with the computer network included in the second network information 440　Correlate the network vulnerabilities and the interactions to determine whether a network security issue is affecting the computer network 450　Determine a vulnerability assessment score indicating a severity of the network security issue 460　Generate a network threat alert based on the vulnerability assessment score exceeding a threshold value

(56)     References Cited

U.S. PATENT DOCUMENTS

| | | | |
|---|---|---|---|
| 11,736,507 B2 * | 8/2023 | Ewaida | H04L 63/1433 |
| | | | 726/25 |
| 2009/0235359 A1 * | 9/2009 | Abdulhayoglu | H04L 63/1433 |
| | | | 726/25 |
| 2015/0033340 A1 * | 1/2015 | Giokas | H04L 63/1433 |
| | | | 726/23 |
| 2018/0157842 A1 * | 6/2018 | Holz | G06F 16/338 |
| 2018/0309778 A1 | 10/2018 | Sugarbaker | |
| 2020/0112583 A1 * | 4/2020 | Pagano | H04L 63/1433 |
| 2020/0162498 A1 * | 5/2020 | Ababtain | H04L 63/1433 |
| 2021/0185073 A1 * | 6/2021 | Ewaida | H04L 63/1433 |
| 2021/0336981 A1 | 10/2021 | Akella et al. | |

* cited by examiner

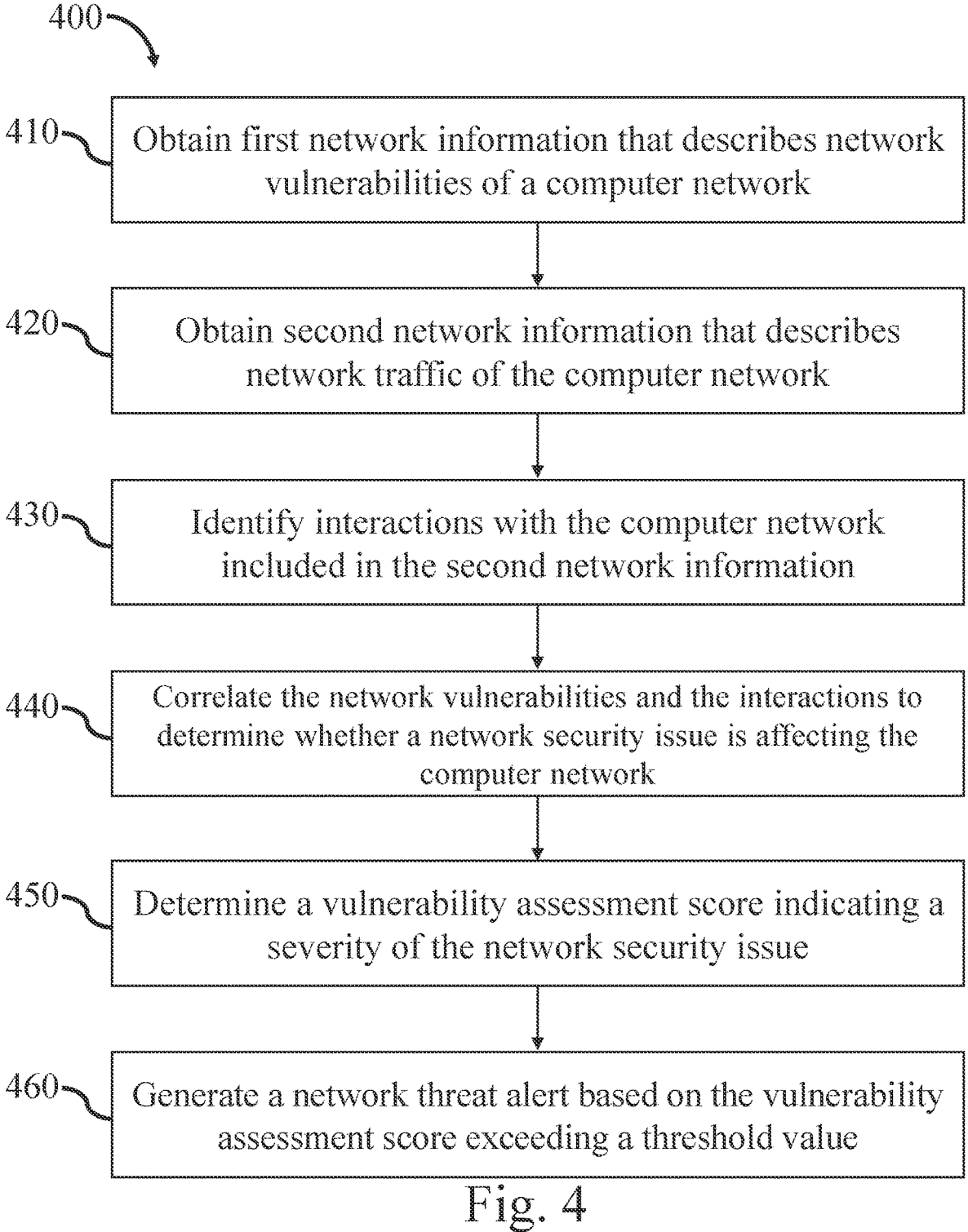

400

410 — Obtain first network information that describes network vulnerabilities of a computer network 420 — Obtain second network information that describes network traffic of the computer network 430 — Identify interactions with the computer network included in the second network information 440 — Correlate the network vulnerabilities and the interactions to determine whether a network security issue is affecting the computer network 450 — Determine a vulnerability assessment score indicating a severity of the network security issue 460 — Generate a network threat alert based on the vulnerability assessment score exceeding a threshold value

Fig. 4

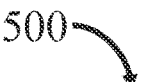
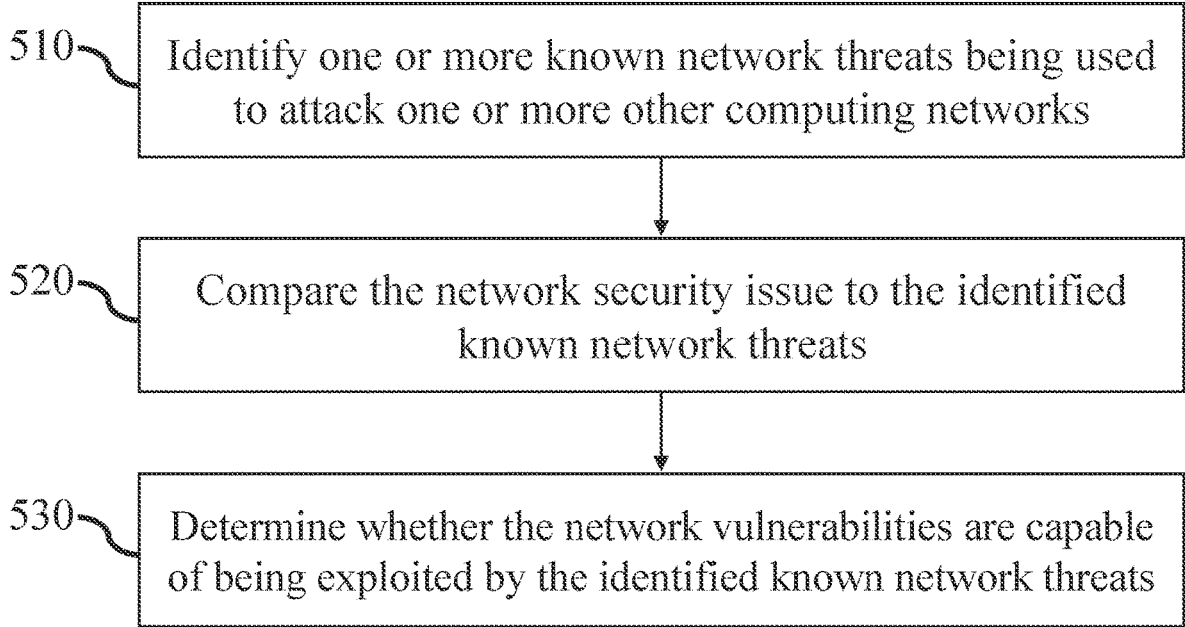
510 — Identify one or more known network threats being used to attack one or more other computing networks
520 — Compare the network security issue to the identified known network threats
530 — Determine whether the network vulnerabilities are capable of being exploited by the identified known network threats
Fig. 5

NETWORK VULNERABILITY ASSESSMENT

The present disclosure generally relates to a system and a method of network vulnerability assessment.

BACKGROUND

A network vulnerability assessment may include a process of identifying vulnerabilities of a computing environment. The network vulnerability assessment may be performed on various types of devices, systems, and/or networks, such as one or more computers and/or servers of an information technology system.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining first network information from a network scan of a computer network that describes network vulnerabilities of a computer network and second network information that describes network traffic of the computer network. The method may include identifying an interaction with the computer network based on the network traffic included in the second network information. The method may include correlating the first network information and the identified interaction to determine a network security issue for the computer network. Correlating the first network information and the identified interaction may include determining a correspondence between the interaction with the computer network and the network vulnerabilities described by the first network information. A network alert may be generated based on the potential network security issue.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 4 is a flowchart of an example method of assessing network vulnerabilities of one or more devices according to the present disclosure; and FIG. 5 is a flowchart of another example method of assessing network vulnerabilities of one or more devices according to the present disclosure.

DETAILED DESCRIPTION

Figure 1:
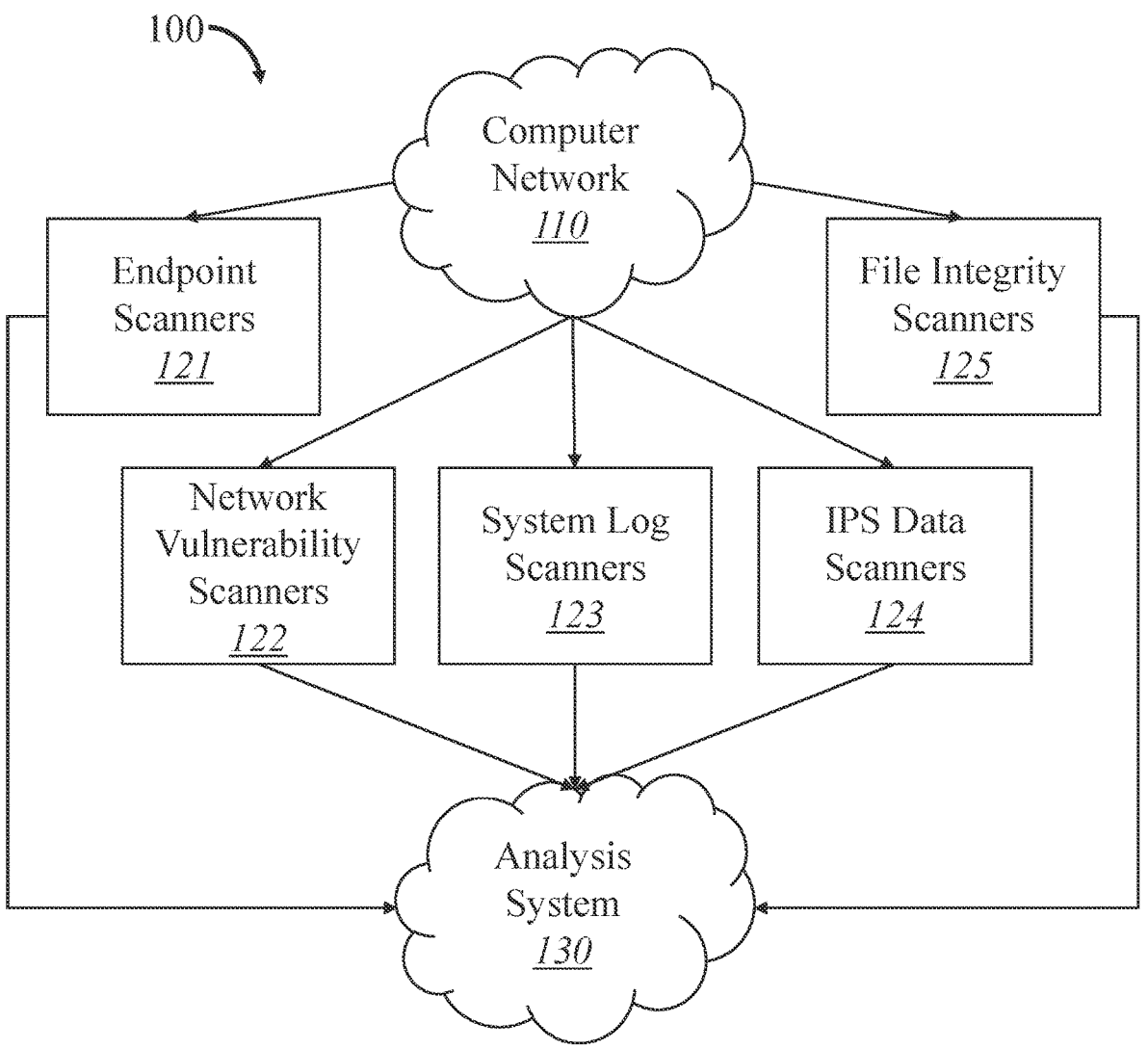
FIG. 1 illustrates an example network environment that may be used to assess network vulnerabilities of one or more devices according to the present disclosure.

Embodiments of the present disclosure may relate to assessing vulnerabilities of a computer network and/or one or more devices (e.g., computers, mobile devices, telecommunications equipment, networking equipment, printers, cameras, etc.) on the computer network.

Conventionally, to enhance operations and/or simplify activities, many entities (e.g., businesses and/or individuals) utilize computer networks to allow devices of computer networks to exchange data, share resources, and otherwise interact. However, many computer networks may be subject to security vulnerabilities that may result in the computer networks and/or a device of the computer networks being accessed by unauthorized computers. The unauthorized computers may be used to view or steal data or take control of the computer network and/or devices of the computer network.

Some existing systems may perform a network vulnerability assessment using standardized (e.g., according to industry standards) network vulnerability scoring methods. For example, a network vulnerability assessment performed by an existing system may assign a numerical score to each assessed network vulnerability in which the numerical score represents a level of the assessed network vulnerability according to the Common Vulnerability Scoring System (CVSS). In these and other examples, the assessed network vulnerability may be considered a significant or "Critical" threat with a CVSS score of 9.0 to 10.0, a "High" threat with a CVSS score of 7.0 to 8.9, a "Medium" threat with a CVSS score of 4.0 to 6.9, or a "Low" threat with a CVSS score of 0.1 to 3.9.

However, existing systems performing a network vulnerability assessment based on standardized critiquing methods may fail to consider the prevalence of network security threats being used to exploit the assessed network vulnerabilities. In other words, the threat assessment according to a standardized rating system, such as the CVSS, may fail to consider specific characteristics and operations of a particular computer network when assessing the level of network security threats. For example, security threats that are assigned CVSS scores corresponding to a "Medium" or a "Low" threats may be exploited in practice more frequently than security threats that are deemed "Critical" threats. As such, a system and/or a method of performing network vulnerability assessments that is capable of considering a wider variety of information about the assessed network vulnerabilities may provide a more accurate evaluation of the severity of a particular network vulnerability with respect to a particular computer network.

The present disclosure may, among other things, provide a method and a system of network vulnerability assessment that includes obtaining first network information that describes network vulnerabilities of a computer network from a network scan of the computer network and second network information that describes network traffic of the computer network. Interactions with the computer network may be identified based on the network traffic included in the second network information. The first network information and the identified interactions with the computer network may be correlated to determine a network security issue for the computer network. Correlating the first network information and the identified interactions may involve determining a correspondence between the interactions with the computer network and the network vulnerabilities described by the first network information. A network alert may be generated based on the potential network security issue.

Accordingly, various embodiments described in this disclosure set forth a technical solution to a technological problem with respect to network vulnerability assessment of devices. The technological problem outlined herein regarding the assessment of network vulnerability scans did not exist before computer technology and is directly related to computer technology. The various embodiments described herein set forth a technical solution to the technical problem that requires implementation by a computer or computer system. Alternatively or additionally, the systems and methods described in this disclosure may solve other technological problems and provide other technical solutions.

Furthermore, the systems and methods described in this disclosure are at least in the technological field of computer networks, in particular the technological field with respect to network security. The systems and methods described in this disclosure may be relevant and useful in other technological fields as well.

Embodiments of the present disclosure will be explained with reference to the accompanying drawings.

FIG. 1 illustrates an example network environment 100 that may be used to assess network vulnerabilities of a computer network according to the present disclosure. The network environment 100 may include a computer network 110 and one or more network scanners that are configured to obtain information about the computer network 110 and send the obtained network information to an analysis system 130.

The computer network 110 may include multiple user devices or other computers (collectively referred to herein as "computer devices") that are configured to communicate with each other via one or more communication channels. The computer devices may include specialized or general-purpose network hosts that are configured to communicate with other network hosts, such as personal computers, one or more servers, mobile devices, or Internet of Things devices. Additionally or alternatively, the computer network 110 may include network hardware that facilitate communication between the computer devices. For example, the network hardware may include modems, hubs, bridges, switches data terminal equipment, or any other type of redistribution or communication point. In some embodiments, the network hardware may communicatively couple the computer devices with one another or to various other computer devices or computer networks via the Internet. As such, the computer devices and the network hardware may be configured as a local-area network (LAN) in which the computer devices are configured to communicate internally with other computer devices included in the computer network 110 or as a wide-area network (WAN) that is configured to communicate and interact with computer devices included in and external to the computer network 110 (i.e., other computer networks). In these and other embodiments, the computer network 110 may include computer hardware or software that is configured to filter inbound or outbound network traffic (e.g., a firewall).

In some embodiments, the network scanners in the network environment 100 may include one or more endpoint scanners 121, one or more network vulnerability scanners 122, one or more system log scanners 123, one or more data scanners 124, and one or more file integrity scanners 125.

Although the network scanners are described and illustrated as discrete scanners, the network scanners may include code and routines configured to enable a computing system to perform one or more operations. Additionally or alternatively, the network scanners may be implemented using hardware including a processor, a microprocessor (e.g., to perform or control performance of one or more operations), a field-programmable gate array (FPGA), or an application-specific integrated circuit (ASIC). In some other instances, the network scanners may be implemented using a combination of hardware and software. In the present disclosure, operations described as being performed by the network scanners may include operations that the network scanners may direct a corresponding system to perform. The network scanners may be configured to perform a series of operations with respect to a computer network, such as the computer network 110, as described in further detail below in relation to FIG. 2, 3, 4, or 5.

In some embodiments, the endpoint scanners 121 may include scanners that are configured to obtain information about the computer network 110 from one or more endpoint vendors associated with the computer network 110. The endpoint vendors may provide network monitoring, network scanning, or any other network security services for the computer network 110, and the endpoint vendors may consequently collect and analyze information relating to the computer network 110. For example, a particular endpoint vendor may include an antivirus service or any other security software service (e.g., NORTON®, MCAFEE®, SOPHOS®, etc.) that is configured to scan files or other network traffic coming into the computer network 110 or on devices within the computer network 110.

In some embodiments, the endpoint scanners 121 may include programs or other software installed on one or more user devices included in the computer network 110, and the endpoint scanners 121 may be configured to provide network monitoring for the particular user devices that have installed the endpoint scanners 121. Additionally or alternatively, the endpoint scanners 121 may be configured to monitor network traffic at a network-node level such that the endpoint scanners 121 review and analyze network traffic at routers, switches, bridges, or any other network nodes. In these and other embodiments, the endpoint scanners 121 may be installed on particular user devices that are configured to monitor the network nodes and/or directly incorporated with the network nodes themselves. The security software service may review incoming or outbound files from the computer network 110 ("network traffic") and compare code included with the scanned network traffic against a database of known viruses and malware and/or analyze the scanned network traffic and flag any network traffic that appears to include code similar to code associated with known viruses or malware.

The endpoint scanners 121 may obtain information about the computer network 110 by obtaining the network analyses of the endpoint vendors. In some embodiments, the endpoint vendors may include one or more application programming interfaces (APIs) that allow communication between the endpoint scanners 121 and the endpoint vendors, which may facilitate obtaining the network information from the endpoint vendors. The endpoint scanners 121 may be configured to obtain information about any scanned files that are flagged by the endpoint vendor as viruses or malware and/or network traffic that is flagged for potentially suspicious behavior. Additionally or alternatively, the endpoint scanners 121 may be configured to obtain metadata relating to a source of the virulent or suspicious code, such as from which internet protocol (IP) address the source code was sent, a time at which the suspicious source code was sent, and a destination of the suspicious source code (e.g., one or more particular end-user devices connected to the computer network 110).

The network vulnerabilities scanners 122 may be configured to scan one or more devices operating within the computer network 110 or the perimeter of the computer network 110 (e.g., incoming and outbound network traffic) and identify any network vulnerabilities. In some embodiments, the network vulnerabilities scanners 122 may include a port mapper that is configured to generate a portmap corresponding to the computer network 110 in which the portmap indicates which network communications are assigned to which network ports corresponding to devices operating on the computer network 110. The network vulnerabilities scanners 122 may identify which network ports of the devices of the computer network 110 are being used by devices communicating with the computer network 110 and/or which network ports of the devices of the computer network 110 have been or potentially could be used for communication with the computer network 110 (e.g., open for network traffics even if network traffic is not presently occurring over the port). The network ports of the devices of the computer network 110 that are used by devices and/or have been or potentially could be used by devices communicating with the computer network 110 may be identified as potentially vulnerable network ports. One or more network security issues that have been experienced and reported by other computer networks or any other types of network communication may be tested against each of the potentially vulnerable network ports to determine whether the tested potentially vulnerable network ports are susceptible to the network security issues. In some instances, the potentially vulnerable network ports may be considered susceptible to the network security issues if the network vulnerabilities scanners 122 determine that the network security issues may access the computer network 110 through the potentially vulnerable network ports. In these and other instances, the potentially vulnerable network ports may be labeled as network vulnerabilities by the network vulnerabilities scanners 122. The potentially vulnerable network ports may be labeled as susceptible network ports or network vulnerabilities, and the network vulnerabilities scanners 122 may send a list of the network vulnerabilities to the analysis system 130 for processing alongside information provided by the other network scanners.

Additionally or alternatively, the network vulnerabilities scanners 122 may identify one or more computing devices or networks that are communicating with the computer network 110. The network vulnerabilities scanners 122 may identify some or all active hosts that communicate with the computer network 110 by having one or more devices of the computer network 110 ping each of the devices that are currently and/or have recently communicated with the computer network 110 (e.g., via the devices that the network vulnerabilities scanners 122 instructed to ping other devices) in which any of the devices that respond to the ping being considered active hosts. Additionally or alternatively, the network vulnerabilities scanners 122 may instruct any other devices and/or software to perform one or more operations associated with communicating with active hosts associated with the computer network 110.

The network vulnerabilities scanners 122 may determine the identities of the active hosts according to an IP address associated with the active hosts. The network vulnerabilities scanners 122 may cross-reference the IP addresses of the identified active hosts against a list of IP addresses associated with known threat actors (e.g., provided to the network vulnerability scanners 122 by the analysis system 130) to determine whether it is likely that one or more of the known threat actors may be attempting to access or attack the computer network 110.

In some embodiments, the network environment 100 may include the system log scanners 123, which may be configured to obtain and parse through log information related to the computer network 110. One or more devices associated with the computer network 110 and/or the computer network 110 itself may generate system logs that document the operations performed by the logged devices and/or events involving the logged devices. For example, system logs may be generated in response to operations relating to loading of one or more system processes or drivers, occurrence of processing errors, or documenting user-action events. In some embodiments, the system log scanners 123 may be configured to obtain any information from one or more network ports that are associated with the system logs. For example, the system log scanners 123 may obtain text files of the system logs or a quantitative summary (e.g., in the form of a vector or a matrix) of events documented in the system logs. The devices in communication with the computer network 110 may be configured to send data relating to their system logs through a particular network port, so the system log scanners 123 may be configured to review and obtain information from the particular network port. Additionally or alternatively, the system log scanners 123 may be configured to detect and obtain any information using a particular network protocol, such as a network protocol that is typically used for communicating log data.

In some embodiments, the network environment 100 may include one or more data scanners 124 that are configured to obtain information from a scanning system of the computer network 110. The scanning system may include an intrusion detection system (IDS) or an intrusion prevention system (IPS) of the computer network 110. The scanning system may include hardware or software (e.g., provided by a firewall vendor) in communication with the computer network 110 that may monitor network traffic entering and exiting the computer network 110 for malicious activity and take actions to prevent or mitigate the malicious activity (e.g., reporting or blocking the network traffic associated with the malicious activity). In some embodiments, the scanning system may identify malicious activity based on a list of computer operations or programs and their associated code that are configured to interact with the computer network 110 and are determined to be related to network security issues. In these and other embodiments, the list may be maintained by the analysis system 130, and the scanning system may receive the list from the analysis system 130. The scanning system may analyze the code associated with files or programs included in the network traffic to determine whether the files or programs include code that is included in the list of computer operations or programs that have been previously identified as malicious activities. The scanning system may generate one or more logs of detected or blocked malicious activity, which the data scanners 124 may obtain and send to the analysis system 130.

In some embodiments, the network environment 100 may include one or more file integrity scanners 125 that monitor incoming, existing, and newly generated files in the computer network 110 to determine whether the files pose a network security risk. In these and other embodiments, the file integrity scanners 125 may analyze various aspects of files being downloaded, created, or modified on one or more user devices included in the computer network 110. For example, the file integrity scanners 125 may review downloaded files to determine whether the source of the downloaded files appears related to known threat actors or the downloaded files include source code corresponding to malware. The file integrity scanners 125 may generate a log detailing reviewed files and send the log to the analysis system 130.

The network scanners may send the information obtained from or relating to the computer network 110 to the analysis system 130. In some embodiments, one or more of the network scanners, including the endpoint scanners 121, the network vulnerability scanners 122, the system log scanners 123, the data scanners 124, and/or the file integrity scanners 125, may be configured to format the information obtained by the network scanners before sending the information to the analysis system 130. Because the information collected by different network scanners may be presented in varying file formats, the network scanners may convert the collected information into one format such that comparison of information received from different network scanners by the analysis system 130 may be more accurate and/or operations of the analysis system 130 may be less prone to errors.

The analysis system 130 may include one or more server configured to receive information from multiple sources (e.g., different network scanners) and analyze the received information. For example, the analysis system 130 may include a cloud computing server, such as a cloud server hosted by AMAZON WEB SERVICES or AZURE. In some embodiments, a computing system operating based on information received by the analysis system 130 may correlate information received from different network scanners to determine a network security issue of the computer network 110. In these and other embodiments, the interactions with the computer network 110 may refer to ways in which data packets included in the network traffic enter or exit the computer network 110. For example, a particular data packet included in the network traffic may be directed towards a particular user device included in the computer network 110 such that a particular interaction with the computer network 110 is the reception of the data packet by the particular user device. As another example, an interaction may include whether data packets are being received by or sent out of the computer network 110 from a particular network port.

The analysis system 130 may determine a potential network security issue by identifying one or more interactions with the computer network 110 included in network traffic and comparing the identified interactions to network vulnerabilities described by network information collected by the endpoint scanners 121. Based on the comparison between the interactions and the network vulnerabilities, the analysis system 130 may assess whether the interactions may affect the computer network 110 and how damaging the interactions affecting the computer network 110 may be (e.g., based on historical information regarding how the potential network security issues have affected other computer networks). Responsive to determining whether and how the interactions may affect the computer network 110, the analysis system 130 may classify the interactions as network security issues.

In these and other embodiments, the analysis system 130 may calculate a vulnerability assessment score indicating a severity of the network security issue. The vulnerability assessment score may be a standardized representation of how severe a particular network security issue is to operations of the computer network 110 such that the a user of the computer network 110 (e.g., a system administrator) may review and prioritize the network security issue affecting the computer network 110. For example, the vulnerability assessment score may be a numerical value within a range of numerical values in which a greater numerical value within the range of numerical values indicates that a particular network security issue is more likely to be exploited (e.g., because the particular network security issue has been detected on a particular network port that has known network vulnerabilities). As additional examples, the vulnerability assessment score may be an alphabetical symbol, a color-coded shape, or any other symbols arranged on a spectrum ranging from low severity (and accordingly, low importance) to high severity (and accordingly, high importance).

In some embodiments, the vulnerability assessment score may be computed by quantifying each of the inputs obtained by the analysis system 130 according to a likelihood that each of the inputs contributes to the existence or the severity of the network security issue (i.e., a "relevance" of the inputs to the network security issue). In these and other embodiments, the inputs may be weighted according to the relevance of each respective input. Additionally or alternatively, the relevance of the inputs relative to the network security issue may differ according to the configuration or operations of a particular computer network. For example, a network vulnerability scanner (e.g., the network vulnerability scanner 122) included with the particular computer network may include one or more potentially vulnerable network ports that are unprotected (e.g., not routed through a firewall of the computer network). In this and other examples, inputs obtained from an endpoint scanner, a system log scanner, an IPS scanner, or a file integrity scanner may be weighted more heavily responsive to determining that the inputs relate to the potentially vulnerable or unprotected network ports. Additionally or alternatively, inputs that frequently provide more information or more relevant information about network security issues may generally be weighted more heavily. For example, information provided by inputs associated with endpoint scanners (e.g., the endpoint scanners 121) or system log scanners (e.g., the system log scanners 123) may be weighted more heavily because the information provided by such scanners tend to provide more relevant information regarding network security issue. As another example, the inputs associated with the endpoint scanners may be weighted more heavily in response to similar information being provided by inputs obtained from IPS data scanners (e.g., the data scanners 124) or file integrity scanners (e.g., the file integrity scanners 125).

In some embodiments, the analysis system 130 may generate a network threat alert based on the vulnerability assessment score exceeding a threshold value and send the network threat alert to one or more users of the computer network 110. In these and other embodiments, the threshold value may be determined by a user based on a tolerance of a particular computer network with respect to network security issues. For example, a particular computer network that does not receive or output sensitive information may be identified by a user as being more tolerant of network security issues, and network threat alerts may not be desired by the user monitoring the particular computer network unless the network threat alerts relate to more serious network security issues. As another example, a particular computer network that frequently receives, generates, or outputs sensitive information may be assigned a lower threshold value at which the network security alerts are generated. Additionally or alternatively, the user may adjust the threshold value such that the analysis system 130 is responsive to changing circumstances regarding network security. For example, the threshold value may be increased responsive to the user determining that many other computer networks have recently been compromised by threat actors or that a particular threat actor has recently targeted computer networks similar to the particular computer network being monitored by the user.

The network threat alert may include a visual, audio, or haptic indicator sent to a user's desktop interface, email inbox, or any other location to alert the user of the network security issue. In these and other embodiments, the network threat alert may include presentation of one or more pieces of information include with the inputs obtained by the analysis system 130. The pieces of information presented by the network threat alerts may be the information associated with the inputs that contributed the most to determining the network threat alert. As such, the user receiving the network threat alert may perform one or more actions based on receiving the network threat alert or the information included with the network threat alert. Additionally or alternatively, the computer network 110 (or one or more devices included in the network environment 100) may be configured to automatically perform operations to mitigate or remove the causes of the network threat alert based on the information included in the network threat alert.

In some embodiments, the analysis system 130 may reformat the received information from the network scanners because the information collected by different network scanners may be presented in varying file formats. As such, the analysis system 130 may be configured to receive information from the network scanners formatted in multiple different file formats and convert the received information into one uniform format such that the analysis system 130 may readily compare information received from different network scanners.

Additionally or alternatively, the information received by the analysis system 130 from the network scanners may include various terms that are specific to a particular information source. For example, some endpoint vendors and firewall vendors may use terms specific to the services provided by the endpoint vendors and firewall vendors rather than a corresponding vernacular term. The analysis system 130 may be configured to translate the source-specific terms into a common term to facilitate comparison of information obtained from various sources.

In some embodiments, the network scanners may encrypt the obtained information because the information collected by the network scanners may be sensitive for security of the computer network 110. As such, the analysis system 130 may be configured to decrypt the encrypted information received from the network scanners. For example, the network scanners may encrypt information using an asymmetric encryption algorithm, such as a Rivest-Shamir-Adleman (RSA) cryptosystem in which the network scanners have access to a public key, and the analysis system 130 has a corresponding private key.

Modifications, additions, or omissions may be made to the network environment 100 without departing from the scope of the present disclosure. For example, the designations of different elements in the manner described is meant to help explain concepts described herein and is not limiting. For instance, in some embodiments, the computer network 110 and/or the analysis system 130 are delineated in the specific manner described to help with explaining concepts described herein but such delineation is not meant to be limiting. For example, the network environment 100 may include one of each of the endpoint scanners 121, network vulnerability scanners 122, system log scanner 123, data scanners 124, and file integrity scanners 125. As another example, the network environment may include only one type of the previously described scanners, only two types of scanners, only three types of scanners, etc. Further, the network environment 100 may include any number of other elements or may be implemented within other systems or contexts than those described.

Figure 2:
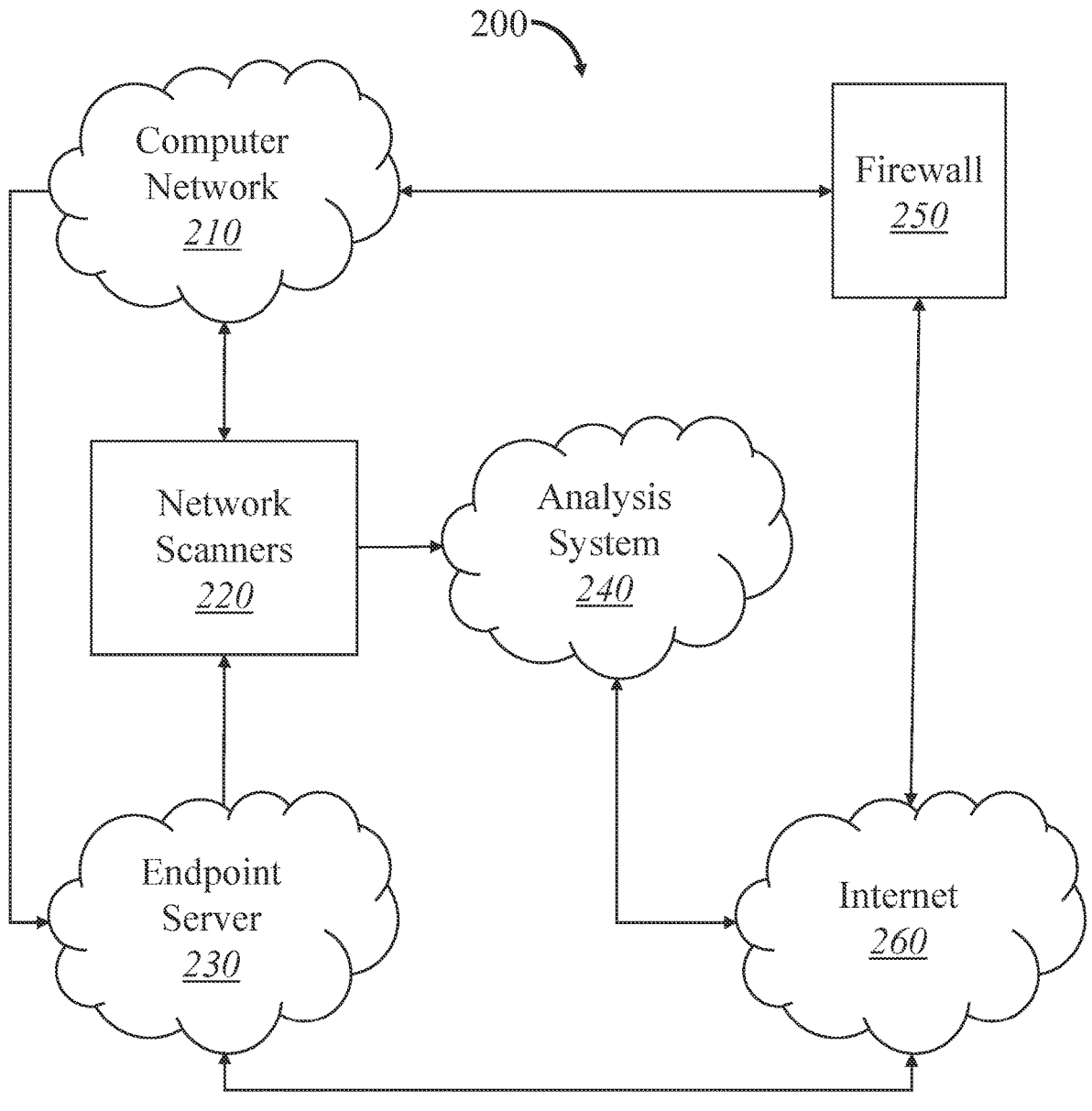
FIG. 2 illustrates another example network environment that may be used to assess network vulnerabilities of one or more devices according to the present disclosure.

FIG. 2 illustrates another example network environment 200 that may be used to assess network vulnerabilities of one or more devices according to the present disclosure. In some embodiments, the network environment 200 may include a computer network 210 that is communicatively coupled to one or more network scanners 220 and a firewall 250. Additionally or alternatively, the network environment 200 may include one or more endpoint servers 230 and an analysis system 240. In these and other embodiments, the computer network 210, the endpoint servers 230, and the analysis system 240 may be configured to communicate with the Internet 260 such that the computer network 210, the endpoint servers 230, and the analysis system 240 may send information to and receive information from other computer networks or user devices via the Internet 260.

In some embodiments, the network scanners 220 may be configured to scan the computer network 210 and obtain information describing network traffic associated with the network environment 200, such as data relating to operations of one or more user devices or computing systems operating within the computer network 210 or data describing network vulnerabilities of the network environment 200. The network scanners 220 may include, for example, an endpoint scanner (such as the endpoint scanner 121 as described in relation to FIG. 1), a network vulnerability scanner (such as the network vulnerability scanner 122 as described in relation to FIG. 1), a system log scanner (such as the system log scanner 123 as described in relation to FIG. 1), an IPS scanner (such as the data scanner 124 as described in relation to FIG. 1), or a file integrity scanner (such as the file integrity scanner 125 as described in relation to FIG. 1).

The network scanners 220 may send any information relating to the computer network 210 to the analysis system 240, which may be the same as or similar to the analysis system 130 as described in relation to FIG. 1. In some embodiments, the network scanners 220 may be configured to directly communicate with the analysis system 240 such that any communications between the network scanners 220 and the analysis system 240 bypass the firewall 250. Additionally or alternatively, the network scanners 220 may be configured to send the collected information to the analysis system 240 as outbound network traffic from the computer network 210 routed through the firewall 250 to the Internet 260.

In some embodiments, the analysis system 240 may be configured to identify interactions based on network traffic with user devices included in the network environment 200 or with the network environment 200 itself. The analysis system 240 may correlate the identified interactions with information about any network vulnerabilities of the network environment 200 to determine whether the network environment 200 is experiencing any network security issues as described in relation to the network environment 100 of FIG. 1. Based on a severity or significance of the determined network security issues, the analysis system 240 may generate a network alert and send the network alert to a user, such as a system administrator of the network environment 200.

Additionally or alternatively, the analysis system 240 may generate a vulnerability assessment score in response to identifying one or more network security issues. The vulnerability assessment score may indicate a degree of severity or importance of each of the network security issues individually or in aggregate (e.g., a "level" of the network security issue or issues). In these and other embodiments, the network alert may be generated in response to the vulnerability assessment score exceeding a threshold value.

The level of a particular network security issue may be determined based on how likely a network security issue is to be harmful to the network environment 200. For example, the analysis system 240 may include a list of viruses, spyware, or other malware (collectively referred to as "network security threats") that are currently being used to attack computer networks. In other words, the analysis system 240 may be provided with a list of network security threats that are currently popular with hackers or other threat actors, and the analysis system 240 may be configured to compare any network security issues determined based on the information provided by the network scanners with the list of network security threats. Responsive to determining that a network security issue correspond to any of the network security threats included in the list, the analysis system 240 may determine a severity of the network security issue based on whether any network vulnerabilities of the network environment 200, which may be identified based on the information provided by the network scanners 220, are capable of being exploited by the particular network security issue. As such, the analysis system 240 may determine the level of the network security issue based on a likelihood of the network security issue corresponding to common network security threats and a potential severity of the network security issue to the network environment 200.

Additionally or alternatively, the network scanners 220 may be configured to communicate with other computer networks that communicate with the computer network 210, such as one or more of the endpoint servers 230, to obtain additional information about the computer network 210. For example, a particular endpoint server may be an antivirus service that analyzes files and network traffic from one or more devices corresponding to the computer network 210 and summarize any suspicious behavior detected on the computer network 210. A particular network scanner may be configured to obtain the suspicious-behavior summary from the particular endpoint server and send the suspicious-behavior summary to the analysis system 240 for further analysis alongside information collected by other network scanners 220.

The computer network 210 may include the firewall 250 to filter incoming network traffic to the computer network 210 and outgoing network traffic to other computer networks or devices (e.g., via the Internet 260). In some embodiments, the firewall 250 may be configured to allow communications between the computer network 210 and another known computer network. For example, communications between the computer network 210 and the network scanners 220 or the endpoint server 230 may be allowed to bypass filtering by the firewall 250. Additionally or alternatively, communications between the computer network 210 and the network scanners 220 or the endpoint server 230 may not be whitelisted and such communications may be routed through the firewall 250. Because the network scanners 220 may collect sensitive information relating to operations of the computer network 210, the network scanners 220 may encrypt the collected information before sending it to the analysis system 240 via the Internet 260 as described in relation to FIG. 1.

Modifications, additions, or omissions may be made to the network environment 200 without departing from the scope of the present disclosure. For example, the designations of different elements in the manner described is meant to help explain concepts described herein and is not limiting. For instance, in some embodiments, the computer network 210, the network scanners 220, the endpoint server 230, the analysis system 240, the firewall 250, and/or the Internet 260 are delineated in the specific manner described to help with explaining concepts described herein but such delineation is not meant to be limiting. Further, the network environment 200 may include any number of other elements or may be implemented within other systems or contexts than those described.

Figure 3:
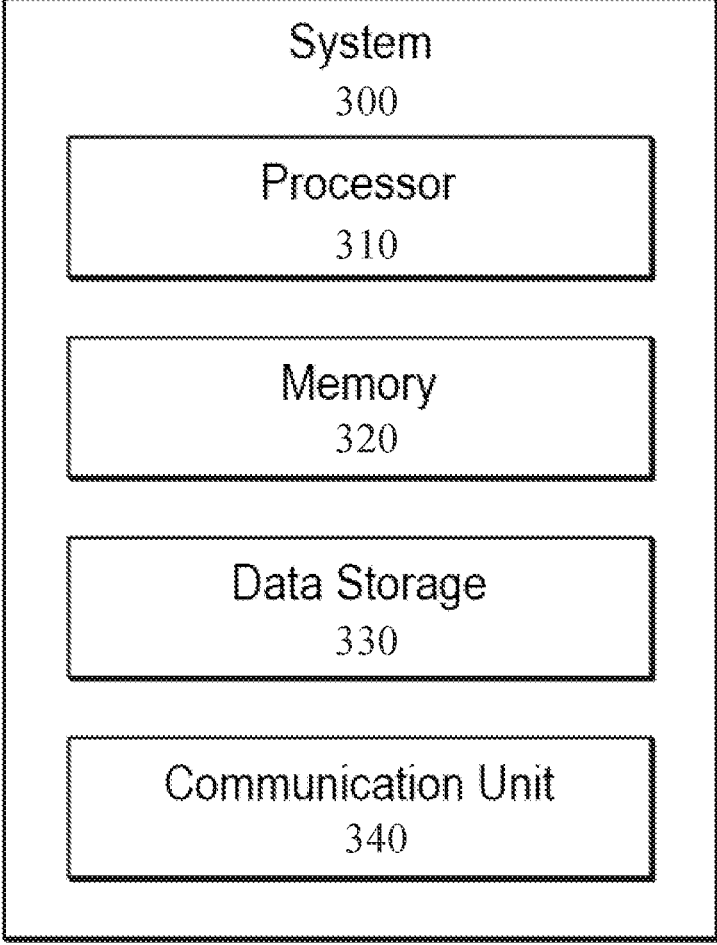
FIG. 3 illustrates an example computing system that may be used during assessment of network vulnerabilities according to the present disclosure.

FIG. 3 illustrates an example computing system 300 that may be used during assessment of network vulnerabilities according to the present disclosure. The computing system 300 may include a processor 310, a memory 320, a data storage 330, and a communication unit 340. The processor 310, the memory 320, the data storage 330, and the communication unit 340 may be communicatively coupled.

In general, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 310 may include any number of processors configured to, individually or collectively, perform or direct performance of any number of operations described in the present disclosure. Additionally, one or more of the processors 310 may be present on one or more different electronic devices, such as different servers.

In some embodiments, the processor 310 may be configured to interpret and/or execute program instructions and/or process data stored in the memory 320, the data storage 330, or the memory 320 and the data storage 330. In some embodiments, the processor 310 may fetch program instructions from the data storage 330 and load the program instructions in the memory 320. After the program instructions are loaded into memory 320, the processor 310 may execute the program instructions.

For example, in some embodiments, the computing system 300 may be part of the computer network 110 or the analysis system 130. In these and other embodiments, the example computing system 300 may be configured to correlate network information relating to network vulnerabilities and observed interactions with the computer network, among other operations.

As another example, the computing system 300 may be part of the endpoint scanners 121, the network vulnerability scanners 122, the system log scanners 123, the data scanners 124, or the file integrity scanners 125. In these and other embodiments, the computing system 300 may be configured to analyze network traffic of a computer network, such as the computer network 110 or the computer network 210, collect information relating to the network traffic of the computer network, and send the collected information to an analysis system, such as the analysis system 130 or the analysis system 240, among other operations.

As another example, the computing system 300 may be part of the analysis system 130 or the analysis system 240. In these and other embodiments, the computing system 300 may be configured to generate a vulnerability assessment score or generating a network threat alert based on the vulnerability assessment score exceeding a threshold value, among other operations.

The memory 320 and the data storage 330 may include computer-readable storage media for carrying or having computer-executable instructions or data structures stored thereon. Such computer-readable storage media may include any available media that may be accessed by a general-purpose or special-purpose computer, such as the processor 310. By way of example, and not limitation, such computer-readable storage media may include tangible or non-transitory computer-readable storage media including Random Access Memory (RAM), Read-Only Memory (ROM), Electrically Erasable Programmable Read-Only Memory (EE-PROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Modifications, additions, or omissions may be made to the computing system 300 without departing from the scope of the present disclosure. For example, in some embodiments, the computing system 300 may include any number of other components that may not be explicitly illustrated or described.

FIG. 4 is a flowchart of an example method 400 of assessing network vulnerabilities of one or more devices according to the present disclosure. The method 400 may be arranged in accordance with at least one embodiment described in the present disclosure. The method 400 may be performed, in some embodiments, by a device or system, such as the computer network 110, and/or the analysis system 130 of FIG. 1 or the computer network 210, the network scanners 220, and/or the analysis system 240 of FIG. 2, or another device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 410, where first network information that describes network vulnerabilities of a computer network may be obtained. In some embodiments, the first network information may be obtained by one or more network scanners (e.g., code, routine, or hardware). For example, the first network information may be obtained by the network vulnerability scanners 122 as described in relation to the network environment 100 of FIG. 1.

At block 420, second network information that describes network traffic on the computer network may be obtained. In some embodiments, the second network information may be obtained by one or more network scanners, which may include the network scanners that obtained the first network information relating to the network vulnerabilities. For example, a particular network scanner may be configured as a network vulnerability scanner and as an endpoint scanner, such as the system log scanner 123 as described in relation to the network environment 100 of FIG. 1. Additionally or alternatively, the network scanner may be configured to obtain information the second network information from other hardware or software operating on the computer network. For example, the network scanner may include the endpoint scanner 121, the data scanner 124, or the file integrity scanner 125 as described in relation to the network environment 100 of FIG. 1; such network scanners may obtain information relating to the network traffic on the computer network from third-party endpoint providers, IPS logs, or file integrity scanning programs, respectively.

At block 430, interactions with the computer network included in the network traffic may be identified. The interactions may include code, routines, or operations that are being run or have recently been run on the computer network (e.g., via one or more user devices communicating with the computer network). The interactions may be identified based on analysis of the second network information. For example, a particular endpoint provider may flag code that is used in known viruses or malware that are detected in association with the interactions with the computer network.

At block 440, the network vulnerabilities and the interactions with the computer network may be correlated to determine whether a network security issue is affecting the computer network. In some situations, the interactions may be present on the computer network in locations at which the computer network is not vulnerable to network security issues. For example, a particular interaction may include a known threat actor attempting to enter the computer network through a secure network port. In this example, the particular interaction may not be considered a network security issue because the interaction is unlikely or incapable of affecting the computer network. However, interactions may be detected at locations in the computer network that have known network vulnerabilities. In these and other situations, the interaction may amount to a network security issue because the interaction is more likely to affect the computer network adversely because the network security issues are more likely to affect the computer network through the known network vulnerabilities.

At block 450, a vulnerability assessment score indicating a severity of the network security issue may be determined. In some embodiments, the vulnerability assessment score may be a numerical value within a range of numerical values in which a greater numerical value indicates that a particular network security issue is more likely to be exploited. Additionally or alternatively, the vulnerability assessment score may indicate a determined severity of the network security issue based on potential damage or cost to the computer network caused by the network security issue, sensitivity of information that may be compromised by the network security issue, or according to any other measure of threat severity.

At block 460, a network threat alert may be generated responsive to determining that the network security issue is sufficiently severe. In some embodiments, determining whether a network security issue is severe enough to warrant generating the network threat alert may be specified by an operator (e.g., a system administrator) of the computer network, an analysis system that analyzes the first network information and the second network information, a machine learning model trained to analyze network security scenarios, or any other entity. The entity assessing the severity of the network security issue may set a threshold value for the vulnerability assessment score at which the network threat alert should be generated.

Additionally or alternatively, the entity assessing the network security issue may specify that the network threat alert should be generated in response to identifying particular network security issues. For example, a particular computer network associated with a hospital or any other healthcare facility may incur significant damage due to ransomware attacks that interfere with operations of the hospital or other healthcare facility. In this example, network security issues that include ransomware may be assigned an elevated vulnerability assessment score to reflect the policies and priorities of the computer network.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

FIG. 5 is a flowchart of an example method 500 of assessing the relevance of network vulnerabilities based on one or more identified network threats according to the present disclosure. The method 500 may be arranged in accordance with at least one embodiment described in the present disclosure. The method 500 may be performed, in some embodiments, by a device or system, such as the computer network 110, and/or the analysis system 130 of FIG. 1 or the computer network 210, the network scanners 220, and/or the analysis system 240 of FIG. 2, or another device. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 510, where one or more known network threats being used to attack computer networks are identified. In some embodiments, the known network threats may include frequently used or highly damaging malware. The frequently used malware may be attributed to one or more threat actors recognized by network security groups as having reputations for attacking, infiltrating, or otherwise hacking computer networks. Additionally or alternatively, the known network threats may include any malware that includes a signature associated with one or more of the recognized threat actors.

At block 520, the network security issue affecting the computer network may be compared to the identified known network threats. In some embodiments, code, behavior patterns, or other signatures of the known network threats may be aggregated in a data storage such that comparison with the code, behavior patterns, or signatures of the network security issue affecting the computer network may identify whether the computer network is being affected by such known network threats.

At block 530, whether network vulnerabilities of the computer network may be exploited by the identified known network threats may be determined. Determining whether the known network threats are capable of exploiting the network vulnerabilities of the computer network may be achieved by the same or similar operations as described in relation to the operations at blocks 440 and 450 of the method 400 of FIG. 4.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

obtaining first network information from a network scan of a plurality of devices of a computer network that includes a first device, the first network information describing network vulnerabilities of the plurality of devices of the computer network;

obtaining second network information describing network traffic unassociated with the network scan that is directed to and sent from the plurality of devices of the computer network that were subject to the network scan;

identifying an interaction with the computer network that is caused by the network traffic included in the second network information, the interaction including code run on the first device of the computer network;

correlating the first network information and the identified interaction to determine a network security issue for the first device of the computer network, correlating the first network information and the identified interaction including determining whether the first device on which the code is run includes a network vulnerability as identified by the network scan; and generating a network alert based on the network security issue for the first device.

2. The method of claim 1, wherein obtaining the first network information comprises:

scanning one or more network ports of the computer network; and determining whether the scanned network ports are potentially vulnerable network ports, wherein the potentially vulnerable network ports are identified as network vulnerabilities of the computer network.

3. The method of claim 1, wherein obtaining the second network information comprises collecting the network traffic from within a firewall of the computer network.

4. The method of claim 1, wherein obtaining the second network information comprises collecting one or more system logs from one or more endpoint servers.

5. The method of claim 1, wherein the second network information includes at least one of: endpoint provider data, intrusion protection system logs, file metadata, and file integrity information.

6. The method of claim 1, further comprising:

obtaining an indication of one or more network security threats currently being used to attack one or more computer networks, the network security threats including malware used in network security attacks against one or more other computer networks;

comparing the network security issue to the obtained indications to determine whether the network security issue corresponds to one or more of the network security threats; and determining whether the network vulnerabilities are capable of being exploited by the network security issue based on the comparison between the network security issue and the indications of the network security threats, wherein the network alert is generated based on whether the network vulnerabilities are capable of being exploited.

7. The method of claim 6, further comprising determining a vulnerability assessment score indicating a level of the network security issue, wherein the level of the network security issue is based on a likelihood of the network security issue corresponding to one or more of the network security threats and a severity of the network security threats to which the network security issue corresponds and the network alert is generated in response to the vulnerability assessment score exceeding a threshold.

8. One or more non-transitory computer-readable storage media configured to store instructions that, in response to being executed by a system, cause the system to perform operations, the operations comprising:

obtaining first network information from a network scan of a plurality of devices of a computer network that includes a first device, the first network information describing network vulnerabilities of the plurality of devices of the computer network;

obtaining second network information describing network traffic unassociated with the network scan that is directed to and sent from the plurality of devices of the computer network that were subject to the network scan;

identifying an interaction with the computer network that is caused by the network traffic included in the second network information, the interaction including code run on the first device of the computer network;

correlating the first network information and the identified interaction to determine a network security issue for the first device of the computer network, correlating the first network information and the identified interaction including determining whether the first device on which the code is run includes a network vulnerability as identified by the network scan; and generating a network alert based on the network security issue for the first device.

9. The computer-readable media of claim 8, wherein obtaining the first network information comprises:

scanning one or more network ports of the computer network; and determining whether the scanned network ports are potentially vulnerable network ports, wherein the potentially vulnerable network ports are identified as network vulnerabilities of the computer network.

10. The computer-readable media of claim 8, wherein the operations further comprise:

obtaining an indication of one or more network security threats currently being used to attack one or more computer networks, the network security threats including malware used in network security attacks against one or more other computer networks;

comparing the network security issue to the obtained indications to determine whether the network security issue corresponds to one or more of the network security threats; and determining whether the network vulnerabilities are capable of being exploited by the network security issue based on the comparison between the network security issue and the indications of the network security threats, wherein the network alert is generated based on whether the network vulnerabilities are capable of being exploited.

11. The computer-readable media of claim 8, wherein the operations further comprise determining a vulnerability assessment score indicating a level of the network security issue, wherein the network alert is generated in response to the vulnerability assessment score exceeding a threshold.

12. The computer-readable media of claim 11, wherein the level of the network security issue is based on a likelihood of the network security issue corresponding to one or more network security threats and a severity of the network security threats to which the network security issue corresponds.

13. The computer-readable media of claim 8, wherein obtaining the second network information comprises collecting one or more system logs from one or more endpoint servers.

14. The computer-readable media of claim 8, wherein the second network information includes at least one of: endpoint provider data, intrusion protection system logs, file metadata, and file integrity information.

15. A system comprising:

one or more processors; and one or more non-transitory computer-readable storage media configured to store instructions that, in response to being executed, cause the system to perform operations, the operations comprising:

obtaining first network information from a network scan of a plurality of devices of a computer network that includes a first device, the first network information describing network vulnerabilities of the plurality of devices of the computer network;

obtaining second network information describing network traffic unassociated with the network scan that is directed to and sent from the plurality of devices of the computer network that were subject to the network scan;

identifying an interaction with the computer network that is caused by the network traffic included in the second network information, the interaction including code run on the first device of the computer network;

correlating the first network information and the identified interaction to determine a network security issue for the first device of the computer network, correlating the first network information and the identified interaction including determining whether the first device on which the code is run includes a network vulnerability as identified by the network scan; and generating a network alert based on the network security issue for the first device.

16. The system of claim 15, wherein obtaining the first network information comprises:

scanning one or more network ports of the computer network; and determining whether the scanned network ports are potentially vulnerable network ports, wherein the potentially vulnerable network ports are identified as network vulnerabilities of the computer network.

17. The system of claim 15, wherein obtaining the second network information comprises collecting network traffic from within a firewall of the computer network.

18. The system of claim 15, wherein obtaining the second network information comprises collecting one or more system logs from one or more endpoint servers.

19. The system of claim 15, wherein the second network information includes at least one of: endpoint provider data, intrusion protection system logs, file metadata, and file integrity information.

20. The system of claim 15, further comprising:

obtaining an indication of one or more network security threats currently being used to attack one or more computer networks, the network security threats including malware used in network security attacks against one or more other computer networks;

comparing the network security issue to the obtained indications to determine whether the network security issue corresponds to one or more of the network security threats; and determining whether the network vulnerabilities are capable of being exploited by the network security issue based on the comparison between the network security issue and the indications of the network security threats, wherein the network alert is generated based on whether the network vulnerabilities are capable of being exploited.

* * * * *